US011705827B2

(12) United States Patent
Hague et al.

(10) Patent No.: US 11,705,827 B2
(45) Date of Patent: Jul. 18, 2023

(54) RECTIFIER BRIDGE

(71) Applicant: STMicroelectronics (Tours) SAS, Tours (FR)

(72) Inventors: Yannick Hague, Mettray (FR); Romain Launois, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 17/888,686

(22) Filed: Aug. 16, 2022

(65) Prior Publication Data

US 2022/0393608 A1 Dec. 8, 2022

Related U.S. Application Data

(62) Division of application No. 17/071,193, filed on Oct. 15, 2020, now Pat. No. 11,451,157.

(30) Foreign Application Priority Data

Oct. 30, 2019 (FR) ...................................... 1912224

(51) Int. Cl.
*H02M 7/162* (2006.01)
*H02M 1/00* (2006.01)
*H02M 7/06* (2006.01)

(52) U.S. Cl.
CPC ......... *H02M 7/162* (2013.01); *H02M 1/0085* (2021.05); *H02M 7/062* (2013.01)

(58) Field of Classification Search
CPC .... H02M 7/162; H02M 1/0085; H02M 7/125; H02M 7/062

USPC ................................... 363/54, 126, 127, 128
See application file for complete search history.

(56) References Cited

U.S. PATENT DOCUMENTS

| 2004/0120089 | A1  | 6/2004 | Temesi et al. |
| 2011/0122667 | A1  | 5/2011 | Mino et al. |
| 2011/0134671 | A1  | 6/2011 | Balocco |
| 2014/0098584 | A1* | 4/2014 | Gucyski ............ H02M 7/06 363/126 |
| 2016/0301326 | A1  | 10/2016 | Gonthier et al. |
| 2017/0110970 | A1  | 4/2017 | Larosa et al. |

(Continued)

FOREIGN PATENT DOCUMENTS

| EP | 1411623 A1 | 4/2004 |
| EP | 2843815 A2 | 3/2015 |

(Continued)

OTHER PUBLICATIONS

INPI Search Report and Written Opinion for FR 1912224 dated Jul. 9, 2020 (9 pages).

*Primary Examiner* — Alex Torres-Rivera
(74) *Attorney, Agent, or Firm* — Crowe & Dunlevy (57) ABSTRACT

A circuit includes two input nodes and two output nodes. A rectifier bridge is coupled to the input and output nodes. The rectifier bridge includes a first and second thyristors and a third thyristor coupled in series with a resistor in series. The series coupled third thyristor and resistor are coupled in parallel with one of the first and second thyristors. The first and second thyristors are controlled off, with the third thyristor controlled on, during start up with resistor functioning as an in in-rush current limiter circuit. In normal rectifying operation mode, the first and second thyristors are controlled on, with the third thyristor controlled off.

20 Claims, 7 Drawing Sheets

(56) References Cited

U.S. PATENT DOCUMENTS

2020/0381992 A1* 12/2020 Gonthier ............. H02M 7/1557
2020/0395866 A1* 12/2020 Gonthier ................ H02M 1/32

FOREIGN PATENT DOCUMENTS

EP          3182571  A1    6/2017
FR          3076676  A1    7/2019

* cited by examiner

RECTIFIER BRIDGE

CROSS REFERENCE TO RELATED APPLICATIONS

This application is a divisional of U.S. application for patent Ser. No. 17/071,193, filed Oct. 15, 2020, which claims the priority benefit of French Application for Patent No. 1912224, filed on Oct. 30, 2019, the contents of which are hereby incorporated by reference in their entireties to the maximum extent allowable by law.

TECHNICAL FIELD

The present disclosure relates generally to electronic components and, more specifically, to AC-DC converters. The present disclosure generally applies to any circuit using a rectifier bridge.

BACKGROUND

Numerous AC-DC converter architectures are known, based on controllable rectifier elements, for example thyristors (or SCR for silicon controlled rectifier), or not, for example diodes, mounted as a rectifier bridge, supplied by an AC voltage and providing a DC voltage.

It is generally desired to limit the inrush current, i.e., the peaks of current that occur at each half-wave of the AC current as long as the voltage at the terminals of a capacitor at the output of the rectifier bridge has not reached a sufficient level, in particular in the start-up phases.

There is a need in the art to addresses all or some of the drawbacks of known rectifier bridges.

SUMMARY

One embodiment provides a circuit comprising: two input nodes and two output nodes; a rectifier bridge comprising a first and second thyristors; at least one third thyristor and at least one resistor in series with the third thyristor, the association of the third thyristor and the resistor being coupled in parallel with one of the first and second thyristors.

According to an embodiment, the rectifier bridge is a mixed bridge.

According to an embodiment, one of the first and second thyristors is coupled between a first input node and a first output node and the other first and second thyristors is coupled between a second input node and the first output node.

According to an embodiment, the first and second thyristors are cathode-gate thyristors.

According to an embodiment, the first and second thyristors are anode-gate thyristors.

According to an embodiment, the third thyristor is of the same trigger type as the first and second thyristors.

According to an embodiment, the third thyristor can withstand a maximum current lower than the maximum current potentially being withstood by the first and second thyristors.

According to an embodiment, the circuit comprises two third thyristors.

According to an embodiment, each third thyristor couples one of the input nodes to one of the output nodes.

According to an embodiment, each third thyristor is in series with a separate resistor.

According to an embodiment, each resistor is located between one of the input nodes and the corresponding third thyristor.

According to an embodiment, the third thyristors are coupled in series with a common resistor.

Another embodiment provides a method for controlling a circuit as previously described, comprising a first phase of operation during which the first and second thyristors are off and a second phase of operation during which the third thyristor is off.

According to an embodiment, the first phase corresponds to a transient system in which a capacitor coupling, preferably connecting, the output nodes is charged by way of the third thyristor.

According to an embodiment, the second phase corresponds to an established system in which the capacitor is charged by way of the first and second thyristors.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail.

Unless indicated otherwise, when reference is made to two elements that are connected together, this means a direct connection without any intermediate elements other than conductors, and when reference is made to two elements that are coupled together, this means that these two elements can be connected or coupled by way of one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The described embodiments relate to the realization of a rectifier circuit based on a controllable bridge of two thyristors and two diodes (known as a mixed bridge), or four thyristors.

In a mixed bridge, during a half cycle, a first diode and a first thyristor are on, or forward biased, and a second diode and a second thyristor are off, or reverse biased. During the other half cycle, the first diode and the first thyristor are off and the second diode and the second thyristor are on.

Figure 1:
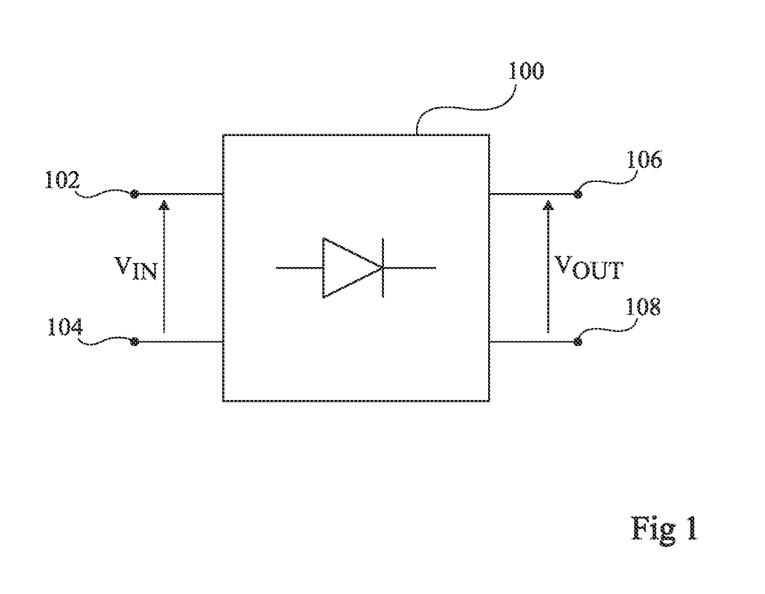
FIG. 1 illustrates schematically an embodiment of an electronic device based on a rectifier bridge.

FIG. 1 illustrates schematically an embodiment of an electronic device 100 based on a rectifier bridge. The circuit 100 is comprised in an electronic device not illustrated, for example a device supplied by a source of alternating current, such as the grid of the electronic distribution network.

The electronic circuit 100 comprises a first input node, or terminal, 102, and a second input node, or terminal, 104 intended to receive a voltage $V_{IN}$ to be rectified.

The electronic circuit 100 comprises a first output node, or terminal, 106, and a second output node, or terminal, 108, intended to provide a rectified output voltage $V_{OUT}$.

The input voltage $V_{IN}$ is, for example, an AC voltage (ac), for example the voltage of the electric distribution network (for example 230 or 120 volts, 50 or 60 Hz) or a voltage provided by another source of AC voltage.

The output voltage $V_{OUT}$ is arbitrarily referenced at the node 108, constituting ground on the side of the rectified voltage. The voltage $V_{OUT}$ is, for example, a positive voltage. The output voltage is generally filtered by a capacitive element (for example by a capacitor), not illustrated in FIG. 1, in order to provide a DC voltage (dc).

The circuit 100 comprises a rectifier bridge comprising at least two thyristors, i.e., a controllable bridge. The circuit 100 further comprises a current limiting circuit for limiting the inrush current.

Preferably, the rectifier bridge is a mixed bridge. The mixed bridge is, for example, a symmetrical mixed bridge, the thyristors of which are located in a same half bridge, high or low. The components of the high half bridge, diodes or thyristors, are coupled, preferably connected, by their cathode to the node 106 and the components of the low half bridge, diodes or thyristors, are coupled, preferably connected, by their anode to the ground 108.

Various embodiments of the circuit 100 will be described in relation to FIGS. 2 to 8.

Figure 2:
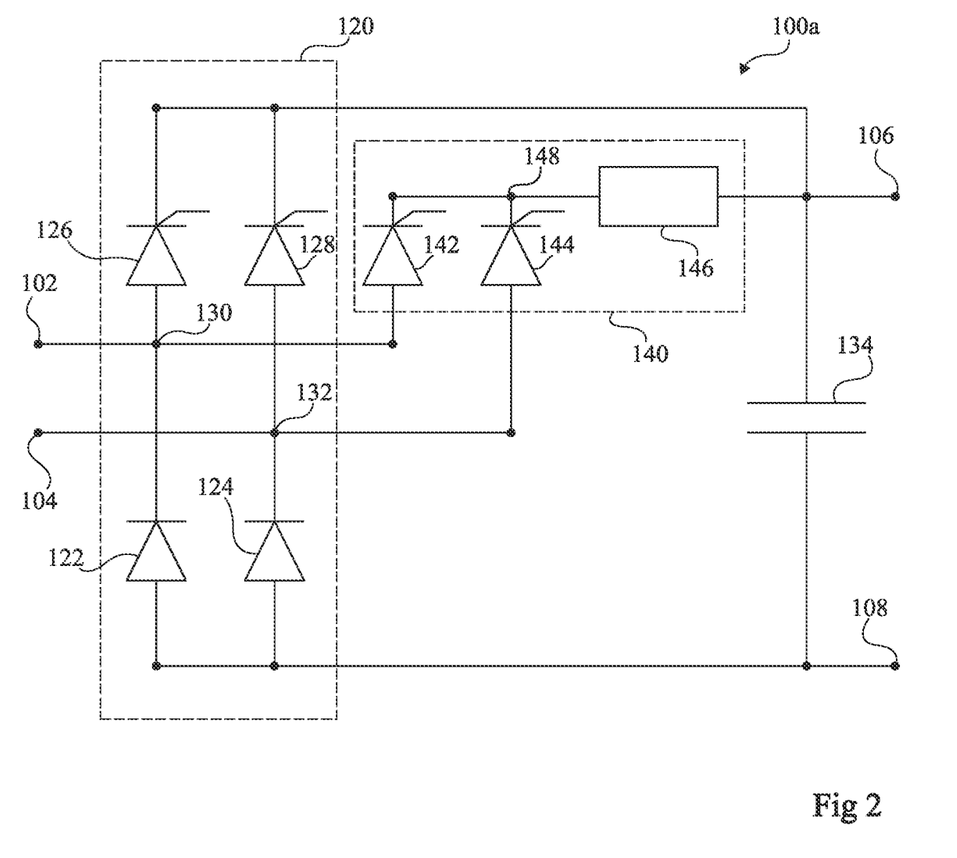
FIG. 2 illustrates schematically an embodiment of the electronic circuit shown in FIG. 1.

FIG. 2 illustrates schematically an embodiment of the electronic circuit 100a shown in FIG. 1.

The rectifier bridge 120 of the circuit 100a is a full-wave mixed bridge, comprising two diodes 122 and 124, constituting the low half bridge, and two thyristors 126 and 128, constituting the high half bridge.

The thyristors 126 and 128 are cathode-gate thyristors. The thyristors 126 and 128 thus have the same trigger type.

Preferably, the thyristors 126 and 128 are identical to each other, with the exception of (i.e., within the limits of) manufacturing variations. Likewise, the diodes 122 and 124 are identical to each other, with the exception of (i.e., within the limits of) manufacturing variations.

The diode 122 and the thyristor 126 are coupled, preferably connected, in series. The series association of the diode 122 and the thyristor 126 is coupled between the nodes 108 and 106. Similarly, the diode 124 and the thyristor 128 are coupled, preferably connected, in series. The series association of the diode 124 and the thyristor 128 is coupled between the nodes 108 and 106. The series association of the diode 122 and the thyristor 126 is thus coupled, preferably connected, in parallel with the series association of the diode 124 and the thyristor 128. The middle point nodes 130 and 132 of the series associations of the diodes 122 and 124 with the respective thyristors 126 and 128 are respectively coupled, preferably connected, to the input nodes 102 and 104.

The thyristor 126 is coupled, preferably connected, by its cathode to the node 106 and by its anode to the node 130 and the diode 122 is coupled, preferably connected, by its cathode to the node 130 and by its anode to the node 108.

In other words, the thyristor 126 couples, preferably connects, the node 106 and the node 130, the anode of the thyristor 126 being on the side of the node 130. The diode 122 couples, preferably connects, the node 108, the anode of the diode 122 being on the side of the node 108.

The thyristor 128 is coupled, preferably connected, by its cathode to the node 106 and by its anode to the node 132 and the diode 124 is coupled, preferably connected, by its cathode to the node 132 and by its anode to the node 108.

The node 130 is coupled, preferably connected, to the node 102. The node 132 is coupled, preferably connected, to the node 104.

The rectifier bridge 120 is thus a symmetrical mixed bridge, i.e., the thyristors 126 and 128 are in a same half bridge, high or low, of the bridge.

The circuit 100a further comprises a smoothing or filtering capacitor 134 coupled, preferably connected, between the terminals 106 and 108. The capacitor 134 has, for example, a capacitance comprised between 100 µF and 1000 µF.

The circuit 100a further comprises a current limitation circuit 140 for limiting the inrush current when the rectifier bridge is started up, i.e., in a transient system when the capacitor is initially discharged. The circuit 140 comprises two thyristors 142 and 144 and a resistor 146. The resistance value of the resistor 146 is, for example, comprised between 5 Ohms and 10 Ohms.

The thyristor 142 is coupled, preferably connected, by its anode to the node 130 and by its cathode to a node 148. The thyristor 144 is coupled, preferably connected, by its anode to the node 132 and by its cathode to the node 148. The terminals of the resistor 146 are coupled, preferably connected, to the nodes 148 and 106.

Thus, the thyristors 142 and 144 are coupled, preferably connected, in series with the resistor 146 respectively between the node 106 and the node 130 and between the node 106 and the node 132. The thyristors 142 and 144 are thus coupled, preferably connected, in series with the resistor 146 common to the two thyristors.

The thyristors 142 and 144 are cathode-gate thyristors. The thyristors 142 and 144 are preferably identical to each other, with the exception of (i.e., within the limits of) of manufacturing variations. For example, the thyristors 142 and 144 are identical, with the exception of (i.e., within the limits of) manufacturing variations, to the thyristors 126 and 128. The thyristors 142 and 144 thus have the same trigger type.

The thyristors 142 and 144 and the diodes 122 and 124 can operate as a rectifier bridge.

During a first phase of operation of the circuit 100a, corresponding to the transient system, the thyristors 126 and 128 are off. More precisely, no trigger current is applied to the thyristors 126 and 128, so that the thyristors 126 and 128 are off whether they are forward biased or reverse biased. The diodes 122 and 124 and the thyristors 142 and 144 of the current limitation circuit 140 thus operate as a rectifier bridge so as to charge the capacitor 134 and provide the output voltage $V_{OUT}$, all while limiting by dissipation in the resistor the inrush current potentially appearing in this first phase of operation.

In particular, the triggers of the thyristors 142 and 144 receive, for example in the half-wave in which they are respectively forward biased, a positive current corresponding to an injection of a trigger current greater than the value of their starting current.

The operation of the rectifier bridge comprising the diodes 122 and 124 and the thyristors 142 and 144 of the current limitation circuit 140 is as follows.

When the input voltage is positive, i.e., when the potential of the node 102 is greater than the potential of the node 104, one of the diodes and one of the thyristors are forward biased and are thus on. The other diode and the other thyristor are reverse biased and are thus off. In the example shown in FIG. 2 in a transient system, the diode 124 and the thyristor 142 are on, or forward biased, and the diode 122 and the thyristor 144 are off, or reverse biased.

When the input voltage is negative, i.e., when the potential of the node 102 is lower than the potential of the node 104, the diode 122 and thyristor 144 that were previously off are turned on and the diode 124 and thyristor 142 that were previously on are turned off.

The resistor 146 is a current limiting resistor for limiting the inrush current. The presence of the resistor 146 protects the components coupled, preferably connected, to the output nodes 106 and 108 during the first phase of operation and avoids the peaks of current at the capacitor 134.

The first phase of operation lasts, for example, less than a second, for example less than 500 ms.

The presence of the resistor 146 involves, however, a loss of power during the first phase of operation. That is why the rectification performed by the thyristors 142 and 144 is replaced, in an established system after the first phase, by a rectification that uses the thyristors 126 and 128.

During a second phase of operation, corresponding to this established system, the thyristors 142 and 144 are no longer controlled and thus remain off. The rectifier bridge 120 is in operation so as to charge the capacitor 134 and to provide the output voltage $V_{OUT}$. As the thyristors 126 and 128 of the bridge 120 are not coupled to the node 106 by the resistor 146, the loss of power caused by this resistor 146 during the first phase is thus not present during the second phase.

The thyristors 126 and 128 are initiated at each half-wave of the voltage $V_{IN}$ in a similar manner to the thyristors 142 and 144 during the transient system. The instructions for controlling the thyristors 122 and 124 in each half-wave depend on the application and in particular on the needs of the load connected downstream.

The operation of the rectifier bridge 120 comprising the diodes 122 and 124 and the thyristors 126 and 128 is identical to the operation of the bridge comprising the diodes 122 and 124 and the thyristors 142 and 144 described in the foregoing, the thyristors 126 and 128 respectively replacing the thyristors 142 and 144.

As a variant, the diodes 122 and 124 can be replaced by thyristors, for example anode-gate thyristors.

Figure 3:
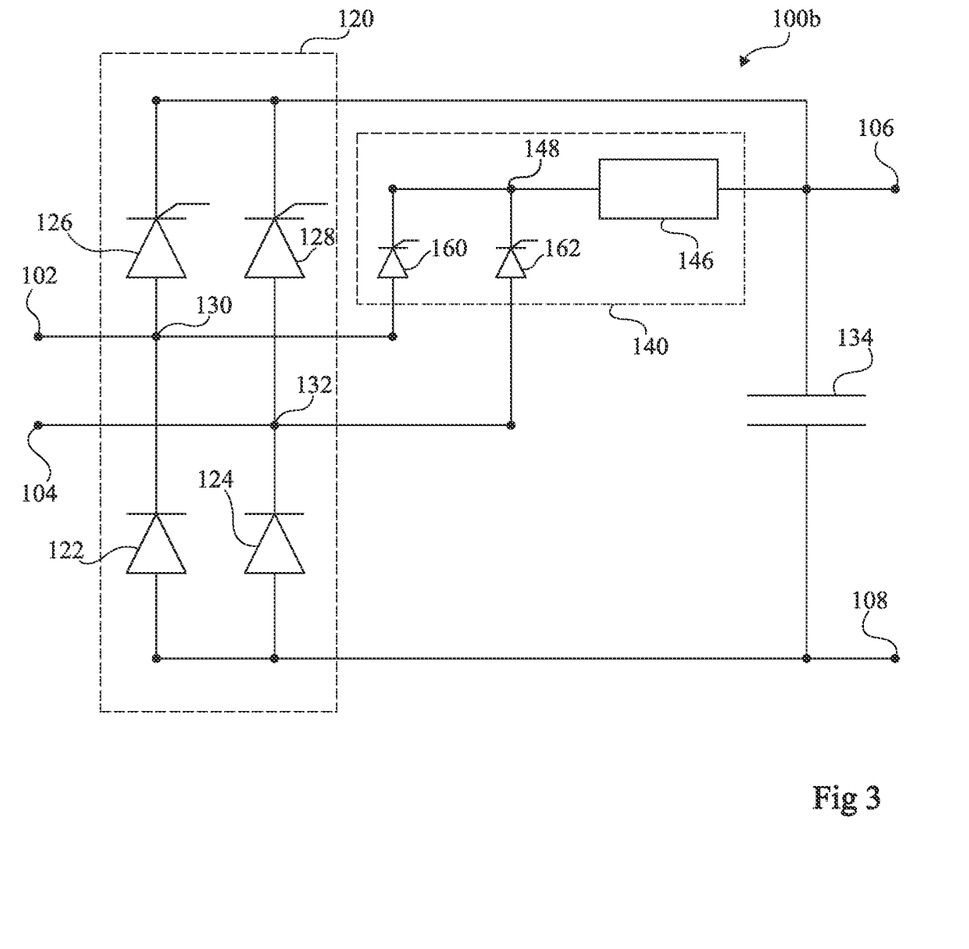
FIG. 3 illustrates, in a schematic fashion, a further embodiment of the circuit shown in FIG. 1.

FIG. 3 illustrates schematically an embodiment of the electronic circuit 100b shown in FIG. 1.

The circuit 100b is identical to the circuit 100a shown in FIG. 1 with the exception of the thyristors 142 and 144 which are respectively replaced by thyristors 160 and 162. The thyristors 160 and 162 are also cathode-gate thyristors.

The thyristor 160 is, like the thyristor 142 shown in FIG. 1, coupled, preferably connected, by its anode to the node 130 and by its cathode to a node 148. The thyristor 162 is, like the thyristor shown in FIG. 1, coupled, preferably connected, by its anode to the node 132 and by its cathode to a node 148.

However, unlike the thyristors 142 and 144, the thyristors 160 and 162 are not identical to the thyristors 126 and 128. Preferably, the thyristors 160 and 162 are identical to each other, with the exception of (i.e., within the limits of) manufacturing variations.

Preferably, the thyristors 160 and 162 can withstand, without being damaged, a current lower than the current potentially being withstood, without being damaged, by the thyristors 126 and 128. For example, the thyristors 160 and 162 can withstand a maximum current three times lower than the current potentially being withstood by the thyristors 126 and 128. For example, the thyristors 126 and 128 can withstand a maximum current substantially equal to 40 Amps and the thyristors 160 and 162 can withstand a maximum current substantially equal to 16 Amps.

Thus, the fact is exploited that the thyristors 160 and 162 are only used during the start-up phase, or transient system, in order to reduce their size with respect to the thyristors 126 and 128 and thus reduce the space required by the circuit and the cost of the circuit.

The operation of the circuit 100b can be deduced from the operation of the circuit 100a shown in the foregoing.

Figure 4:
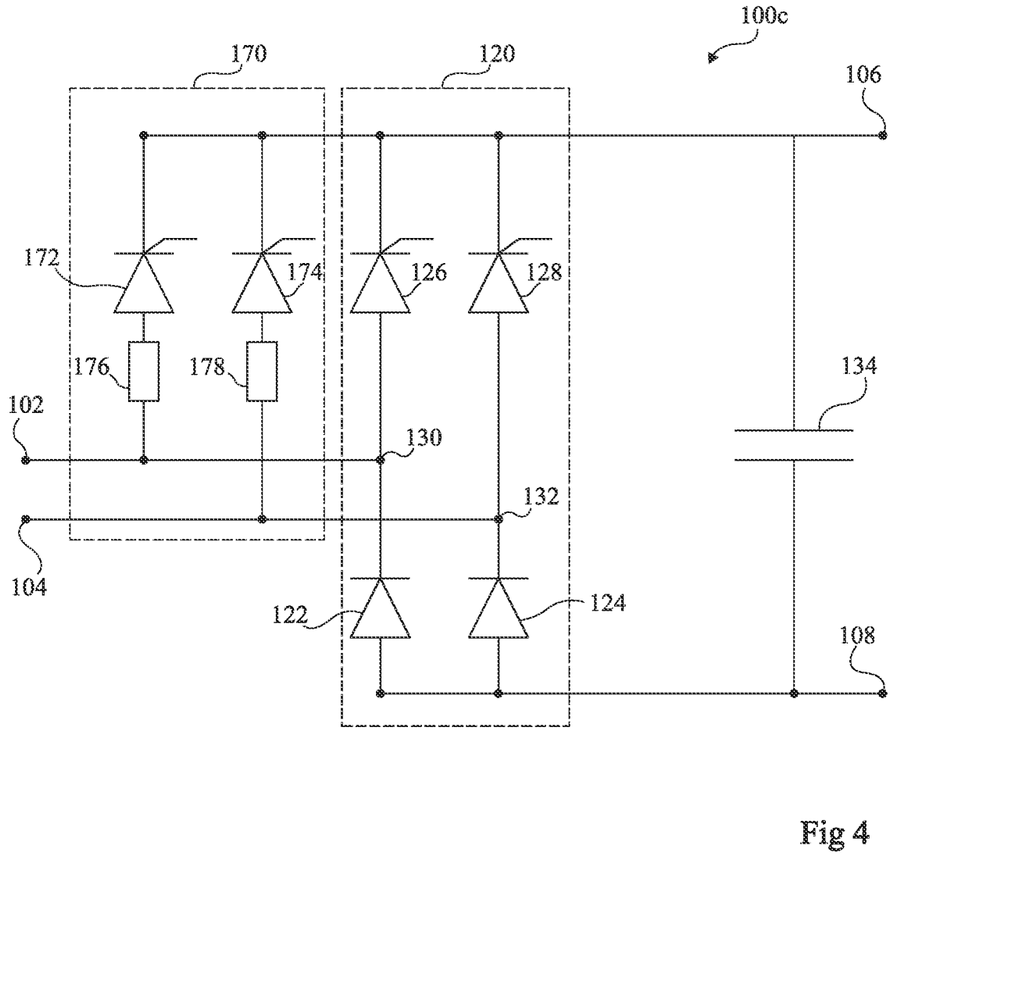
FIG. 4 illustrates, in a schematic fashion, yet a further embodiment of the circuit shown in FIG. 1.

FIG. 4 illustrates schematically an embodiment of the electronic circuit 100c shown in FIG. 1.

The circuit 100c is identical to the circuit 100a shown in FIG. 1 with the exception of the current limiting circuit 140 for limiting the inrush current which is replaced by a circuit 170 for limiting the inrush current.

The current limiting circuit 170 comprises two cathode-gate thyristors 172 and 174 and two resistors 176 and 178.

The thyristor 172 is coupled, preferably connected, in series with the resistor 176 between the nodes 130 and 106, the cathode of the thyristor 172 being on the side of the node 106. The thyristor 174 is coupled, preferably connected, in series with the resistor 178 between the nodes 132 and 106, the cathode of the thyristor 174 being on the side of the node 106.

The thyristors 172 and 174 are thus coupled in series with separate resistors.

The thyristors 172 and 174 are preferably identical to each other, with the exception of (i.e., within the limits of) manufacturing variations. The thyristors 172 and 174 are, for example, identical, with the exception of (i.e., within the limits of) manufacturing variations, to the thyristors 126 and 128. Alternatively, the thyristors 172 and 174 are identical to the thyristors 160 and 162 described in relation to FIG. 3. The thyristors 172 and 174 thus have the same trigger type.

The resistors 176 and 178 are preferably identical to each other, with the exception of (i.e., within the limits of) manufacturing variations. The resistors 176 and 178 have a resistance, for example, substantially comprised between 5 Ohms and 10 Ohms.

The operation of the circuit 100c can be deduced from the operation of the circuit 100a shown in the foregoing.

An advantage of the embodiment shown in FIG. 4 is that the thyristors of the high half bridge of the rectifier bridge 120 and the thyristors of the circuit 170, i.e., the thyristors 126, 128, 172 and 174, are interconnected by their cathodes. More specifically, the cathodes of the thyristors 126, 128, 172 and 174 are preferably connected to the node 106, and are thus connected to one another. Thus, the voltages of the thyristors are referenced at a same point, i.e., the node 106, which facilitates the generation of the trigger signals.

Figure 5:
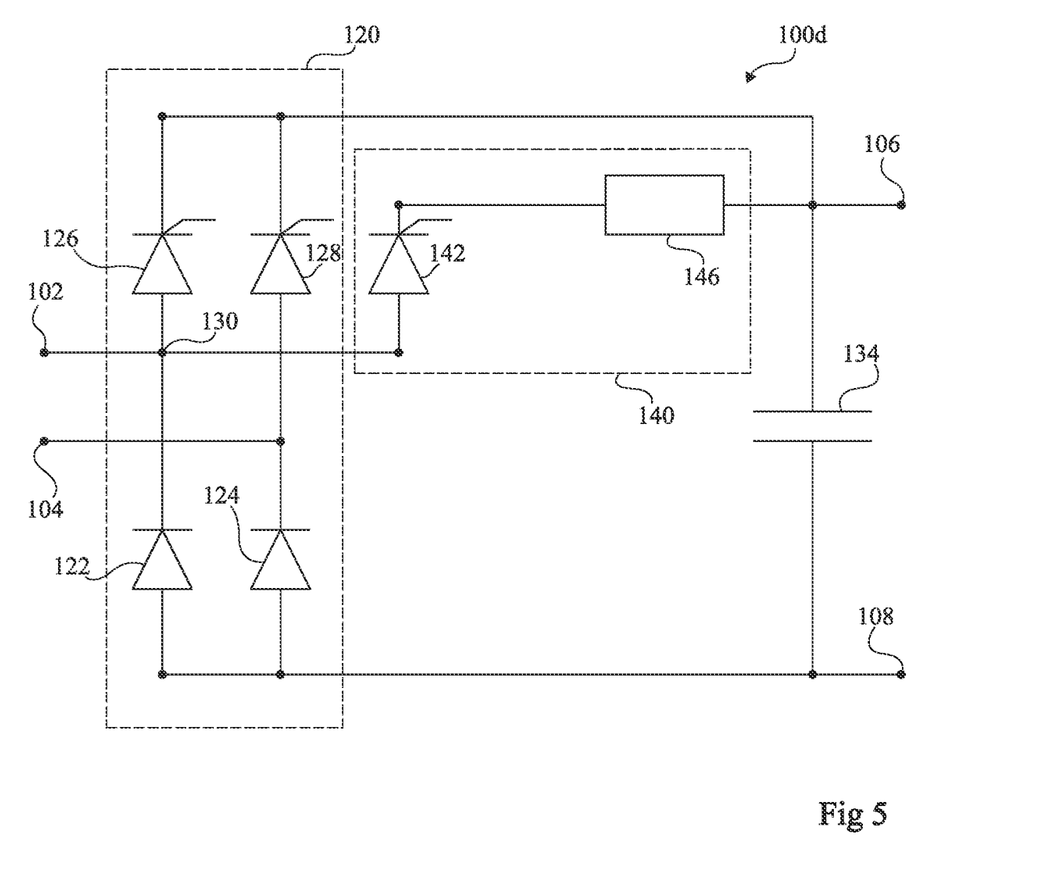
FIG. 5 illustrates, in a schematic fashion, yet a further embodiment of the circuit shown in FIG. 1.

FIG. 5 illustrates schematically an embodiment of the electronic circuit 100d shown in FIG. 1.

The circuit 100d is identical to the circuit 100a with the exception of the thyristor 144 shown in FIG. 1 which is not present in FIG. 5. The current limitation circuit 140 for limiting the inrush current of the circuit 100d thus comprises a single thyristor.

The circuit 140 comprises the thyristor 142 and the resistor 146 coupled in series between the node 106 and the node 130, as described in relation to FIG. 2. More specifically, the anode of the thyristor 142 is coupled, preferably connected, to the node 130. The cathode of the thyristor 142 is coupled, preferably connected, to a terminal of the resistor 146. The other terminal of the resistor 146 is coupled, preferably connected, to the node 106.

As a variant, the respective positions of the resistor 146 and of the thyristor 142 in the association in series are reversed. The cathodes of the thyristors 126, 128, 142 are thus interconnected, as in the example shown in FIG. 4.

The operation of the circuit 100d is similar to the operation of the circuit 100a, with the difference that, during the first phase, i.e., the transient system, the charging of the capacitor only occurs once every two half-waves, i.e., on a half cycle. In the illustrated example (thyristor 142 coupled to the terminal 102), the rectification is carried out on the positive half-waves of the voltage $V_{IN}$. During the second phase, i.e., the established system, the operation of the circuit 100d is identical to the operation of the circuit 100a.

As a variant, the circuit 140 may comprise the thyristor 144 and not comprise the thyristor 142. The circuit 100d thus operates similarly, but on the negative half-waves.

Figure 6:
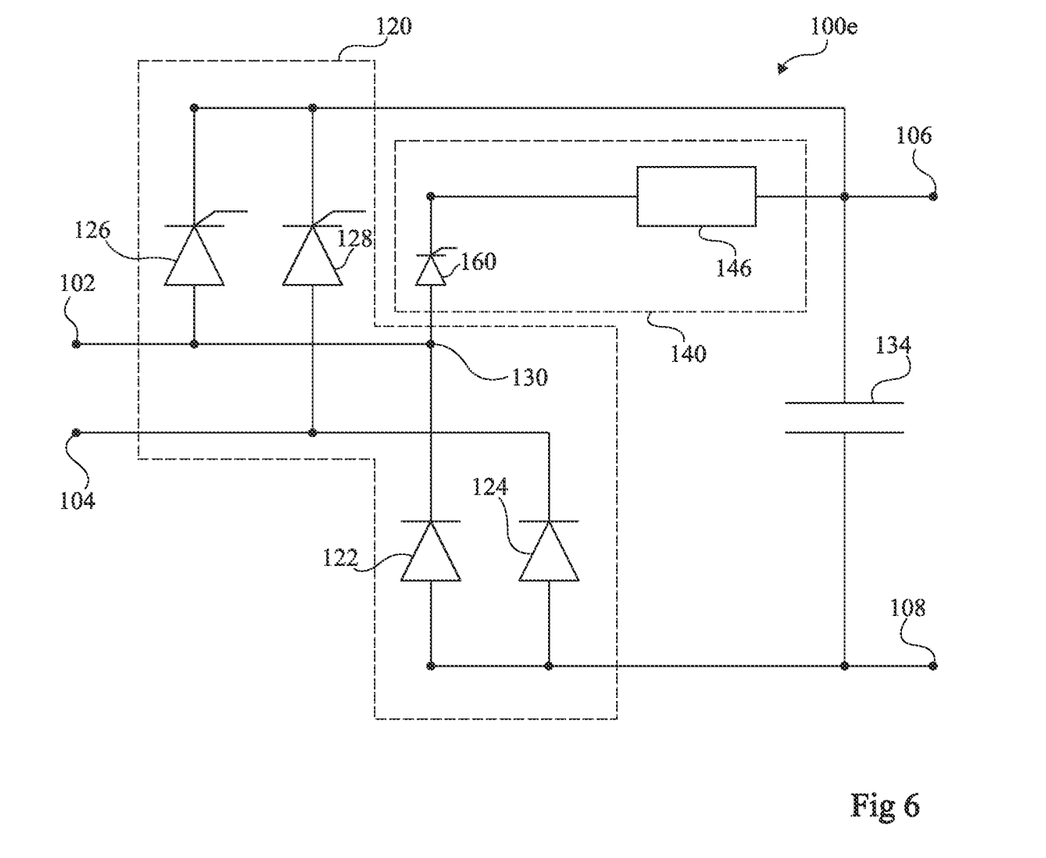
FIG. 6 illustrates, in a schematic fashion, yet a further embodiment of the circuit shown in FIG. 1.

FIG. 6 illustrates schematically an embodiment of the electronic circuit 100e shown in FIG. 1.

The circuit 100e is identical to the circuit 100d, with the exception of the current limiting circuit 140 for limiting the inrush current in which the thyristor 142 is replaced by the thyristor 160 (smaller in size than the thyristors 126 and 128) shown in FIG. 3.

The thyristor 160 and the resistor 146 are thus coupled, like the thyristor 142 and the resistor 146 shown in FIG. 5, in series between the node 106 and the node 130. The respective positions of the resistor 146 and the thyristor 160 can be reversed.

The operation of the circuit 100e is identical to the operation of the circuit 100d. The charging of the capacitor is thus carried out over a half cycle.

As a variant, the circuit 140 may comprise the thyristor 162 and not comprise the thyristor 160. The circuit 100e thus operates in an identical manner.

Figure 7:
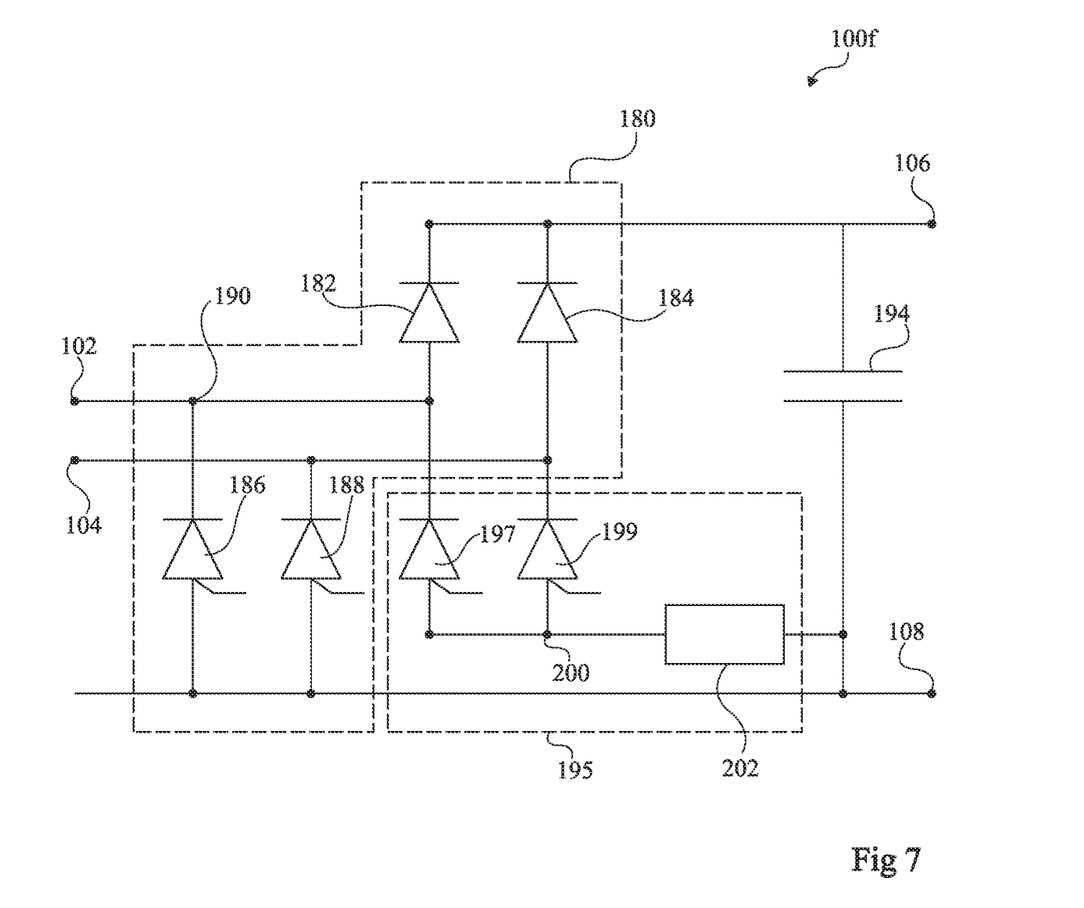
FIG. 7 illustrates, in a schematic fashion, yet a further embodiment of the circuit shown in FIG. 1.

FIG. 7 illustrates schematically an embodiment of the electronic circuit 100f shown in FIG. 1.

The bridge 100f comprises a rectifier bridge 180. The rectifier bridge 180 is a full-wave mixed bridge. The bridge 120 comprises two diodes 182 and 184, constituting the high half bridge, and two thyristors 186 and 188, constituting the low half bridge. The thyristors 186 and 188 are anode-gate thyristors.

Preferably, the thyristors 186 and 188 are identical to each other, with the exception of (i.e., within the limits of) manufacturing variations. Likewise, the diodes 182 and 184 are identical to each other, with the exception of (i.e., within the limits of) manufacturing variations.

The diode 182 and the thyristor 186 are coupled, preferably connected, in series between the nodes 106 and 108. Similarly, the diode 184 and the thyristor 188 are coupled, preferably connected, in series between the nodes 106 and 108. The association of the diode 182 and the thyristor 186 is thus coupled in parallel with the association of the diode 184 and the thyristor 188. The middle point nodes 190 and 192 of the associations in series of the diodes 182 and 184 and the respective thyristors 186 and 188 are respectively coupled, preferably connected, to the input nodes 102 and 104.

In other words, the thyristor 186 is coupled, preferably connected, by its cathode to the node 190 and by its anode to the node 108 and the diode 182 is coupled, preferably connected, by its cathode to the node 106 and by its anode to the node 190. The node 190 is coupled, preferably connected, to the node 102. The thyristor 188 is coupled, preferably connected, by its cathode to the node 192 and by its anode to the node 108 and the diode 184 is coupled, preferably connected, by its cathode to the node 106 and by its anode to the node 192. The node 192 is coupled, preferably connected, to the node 104.

The rectifier bridge 180 is, as shown in FIG. 2, a symmetrical mixed bridge, but with the thyristors 186 and 188 are in the low half bridge.

The circuit 100f further comprises a smoothing or filtering capacitor 194 coupled, preferably connected, between the terminals 106 and 108. The capacitor 194 is, for example, identical to the capacitor 134 shown in FIG. 2. The capacitor 194 has a capacitance, for example, comprised between 100 µF and 1000 µF.

The circuit 100f further comprises a current limiting circuit 195 for limiting the inrush current when the rectifier bridge is started up, i.e., in a transient system when the capacitor is initially discharged. The circuit 195 comprises two thyristors 197 and 199 and a resistor 202. The resistance of the resistor 202 is, for example, comprised between 5 Ohms and 10 Ohms.

The thyristor 197 is coupled, preferably connected, by its anode to a node 200 and by its cathode to the node 190. The thyristor 199 is coupled, preferably connected, by its anode to the node 200 and by its cathode to the node 192. The terminals of the resistor 202 are coupled, preferably connected, to the nodes 200 and 108.

Thus, the thyristors 197 and 199 are coupled in series with the resistor 202 respectively between the node 108 and the node 190 and between the node 108 and the node 192. The thyristors 197 and 199 are thus coupled in series with the resistor 202 shared by the two thyristors.

The thyristors 197 and 199 are anode-gate thyristors. The thyristors 197 and 199 are preferably identical to each other, with the exception of (i.e., within the limits of) manufacturing variations. For example, the thyristors 197 and 199 are identical, with the exception of (i.e., within the limits of) manufacturing variations, to the thyristors 186 and 188. The thyristors 186 and 188 thus have the same trigger type.

The thyristors 197 and 199 and the diodes 182 and 184 operate as a rectifier bridge.

The operation of the circuit shown in FIG. 7 can be deduced from the operation shown in relation to FIG. 2 by taking into account the fact that the thyristors are anode-gate and are thus initiated by extraction of a trigger current.

The variants of the embodiment shown in FIG. 2, explained in relation to FIGS. 3 to 6, can be transposed to the realisation shown in FIG. 7 with anode thyristors.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A circuit, comprising:
a first input node and a second input node;
a first output node and a second output node; and
a rectifier bridge comprising:
a first thyristor having an anode directly connected to the first input node and a cathode directly connected to the first output node;
a second thyristor having an anode directly connected to the second input node and a cathode directly connected to the first output node;
a first resistor having a first terminal and a second terminal directly connected to the first output node;
a third thyristor having an anode directly connected to the first input node and a cathode directly connected to the first terminal of the first resistor; and
a fourth thyristor having an anode directly connected to the second input node and a cathode directly connected to the first terminal of the first resistor.

2. The circuit of claim 1, wherein the first and second thyristors are identical to each other within limits of manufacturing variations.

3. The circuit of claim 2, wherein the third and fourth thyristors are identical to each other within limits of manufacturing variations, and are not identical to the first and second thyristors.

4. The circuit of claim 3, wherein the first and second thyristors can withstand a first maximum current and the third and fourth thyristors can withstand a second maximum current.

5. The circuit of claim 4, wherein the second maximum current is less than the first maximum current by a factor of about 3.

6. The circuit of claim 1, wherein the first, second, third and fourth thyristors are all cathode-gated devices.

7. The circuit according to claim 1, wherein the rectifier bridge is a mixed bridge.

8. A circuit, comprising:
a first input node and a second input node;
a first output node and a second output node; and
a rectifier bridge comprising:
a first thyristor having a cathode directly connected to the first input node and an anode directly connected to the first output node;
a second thyristor having a cathode directly connected to the second input node and an anode directly connected to the first output node;
a first resistor having a first terminal and a second terminal directly connected to the first output node;
a third thyristor having a cathode directly connected to the first input node and an anode directly connected to the first terminal of the first resistor; and
a fourth thyristor having a cathode directly connected to the second input node and an anode directly connected to the first terminal of the first resistor.

9. The circuit of claim 8, wherein the first and second thyristors are identical to each other within limits of manufacturing variations.

10. The circuit of claim 9, wherein the third and fourth thyristors are identical to each other within limits of manufacturing variations, and are not identical to the first and second thyristors.

11. The circuit of claim 10, wherein the first and second thyristors can withstand a first maximum current and the third and fourth thyristors can withstand a second maximum current.

12. The circuit of claim 11, wherein the second maximum current is less than the first maximum current by a factor of about 3.

13. The circuit of claim 8, wherein the first, second, third and fourth thyristors are all anode-gated devices.

14. The circuit according to claim 8, wherein the rectifier bridge is a mixed bridge.

15. A circuit, comprising:
a first input node and a second input node;
a first output node and a second output node; and
a rectifier bridge comprising:
a first thyristor having an anode directly connected to the first input node and a cathode directly connected to the first output node;
a second thyristor having an anode directly connected to the second input node and a cathode directly connected to the first output node;
a resistor having a first terminal and a second terminal directly connected to the first output node; and
a third thyristor having an anode directly connected to the first input node and a cathode directly connected to the first terminal of the resistor.

16. The circuit of claim 15, wherein the first and second thyristors are identical to each other within limits of manufacturing variations.

17. The circuit of claim 16, wherein the third thyristor is identical to each of the first and second thyristors within limits of manufacturing variations.

18. The circuit of claim 16, wherein the third thyristor is not identical to the first and second thyristors.

19. The circuit of claim 18, wherein the first and second thyristors can withstand a first maximum current and the third thyristor can withstand a second maximum current.

20. The circuit of claim 19, wherein the second maximum current is less than the first maximum current.

* * * * *